(12) United States Patent
Lee et al.

(10) Patent No.: US 7,956,105 B2
(45) Date of Patent: Jun. 7, 2011

(54) SILICONE IMPACT MODIFIER WITH HIGH REFRACTIVE INDEX AND METHOD FOR PREPARING THE SAME

(75) Inventors: Han Su Lee, Seoul (KR); Sung Sig Min, Seoul (KR); Byung Choon Lee, Seoul (KR); Byeong Do Lee, Yeosu-si (KR)

(73) Assignee: Cheil Industries Inc., Gumi-si (KR)

( * ) Notice: Subject to any disclaimer, the term of this patent is extended or adjusted under 35 U.S.C. 154(b) by 688 days.

(21) Appl. No.: 11/768,984

(22) Filed: Jun. 27, 2007

(65) Prior Publication Data

US 2008/0097007 A1 Apr. 24, 2008

Related U.S. Application Data

(63) Continuation-in-part of application No. PCT/KR2005/001831, filed on Jun. 15, 2005.

(30) Foreign Application Priority Data

Dec. 31, 2004 (KR) .................. 10-2004-0117912

(51) Int. Cl.
*C08K 5/5419* (2006.01)
*C08L 83/10* (2006.01)

(52) U.S. Cl. ............ 523/201; 428/407; 525/63; 525/55; 525/90; 525/96; 525/241; 525/902; 525/268

(58) Field of Classification Search ............ 523/201; 525/268, 55, 63, 90, 96, 241, 902; 428/407
See application file for complete search history.

(56) References Cited

U.S. PATENT DOCUMENTS

| | | | |
|---|---|---|---|
| 4,888,388 A | 12/1989 | Hongo et al. | |
| 4,994,522 A | 2/1991 | Sasaki et al. | |
| 4,994,523 A | 2/1991 | Sasaki et al. | |
| 5,106,908 A | 4/1992 | Alsmarraie et al. | |
| 5,132,359 A | 7/1992 | Sasaki et al. | |
| 6,153,694 A | 11/2000 | Miyatake et al. | |
| 6,169,149 B1 | 1/2001 | Craig et al. | |
| 6,596,810 B1 | 7/2003 | Hatke et al. | |
| 2005/0038149 A1 | 2/2005 | Hashimoto et al. | |

FOREIGN PATENT DOCUMENTS

| | | |
|---|---|---|
| EP | 0246537 A | 11/1987 |
| EP | 0307963 A | 3/1989 |
| EP | 0326038 A | 8/1989 |
| JP | 6116470 | 4/1994 |
| JP | 09-157484 A | 6/1997 |
| JP | 2000-290482 A | 10/2000 |
| JP | 2001-059006 | 3/2001 |
| JP | 2002-020443 | 1/2002 |
| JP | 2004-331726 | 11/2004 |
| KR | 2004-0090386 | 10/2004 |
| KR | 2004-95402 A | 11/2004 |
| KR | 1020040095402 A * | 11/2004 |
| KR | 2005-15088 A | 2/2005 |
| KR | 2005-49127 A | 5/2005 |
| KR | 2005-0049973 | 5/2005 |
| KR | 2005-0060604 | 6/2005 |
| KR | 2005-60604 A | 6/2005 |
| WO | 00/34346 | 6/2000 |
| WO | 03/068835 | 8/2003 |
| WO | 2006/070983 A1 | 7/2006 |
| WO | WO 2006/070983 * | 7/2006 |

OTHER PUBLICATIONS

European Search Report for European Application Serial No. 05028758, dated May 26, 2006 (cited in copending U.S. Appl. No. 11/323,646.
Office Action in copending U.S. Appl. No. 11/323,646, dated Jan. 18, 2008.
International Search Report for corresponding International Application No. PCT/KR2005/001831 mailed on Sep. 29, 2005.
Supplementary European Search Report in counterpart European Patent Application No. 05750719, dated Jul. 24, 2009.
International Search Report in counterpart International Application No. PCT/KR2005/001831, mailed on Sep. 29, 2005.

* cited by examiner

*Primary Examiner* — Robert D. Harlan
(74) *Attorney, Agent, or Firm* — Summa, Additon & Ashe, P.A.

(57) ABSTRACT

Disclosed is a silicone impact modifier with a high refractive index. The silicone impact modifier can include (A) a rubber core including ($a_1$) an organosiloxane cross-linked (co)polymer with a particle size of about 50 to about 400 nm and ($a_2$) an alkylacrylate-styrenic aromatic compound cross-linked copolymer; and (B) a plastic shell including a vinyl (co)polymer. The refractive index of the silicone impact modifier of the present invention can be about 1.49 to about 1.59.

34 Claims, No Drawings

SILICONE IMPACT MODIFIER WITH HIGH REFRACTIVE INDEX AND METHOD FOR PREPARING THE SAME

CROSS REFERENCE TO RELATED APPLICATIONS

This non-provisional application is a continuation-in-part application of PCT Application No. PCT/KR2005/001831, filed Jun. 15, 2005, pending, which designates the U.S. and which is hereby incorporated by reference in its entirety, and also claims priority from Korean Patent Application No. 10-2004-0117912, filed Dec. 31, 2004, which is also hereby incorporated by reference in its entirety.

FIELD OF THE INVENTION

The present invention relates to a silicone impact modifier with high refractive index and method for preparing the same.

BACKGROUND OF THE INVENTION

Polycarbonate resin has been used as an engineering plastic due to its excellent impact strength, self-extinguishing properties, dimensional stability and heat resistance as compared to other resins. Therefore, polycarbonate resin has been widely used in the production of office automation (OA) instruments, electric or electronic goods and the like.

Polycarbonate resin, however, can have poor flowability due to its high melting point and thus can require high processing temperatures. High processing temperatures can be problematic because the impact resistance of the resultant molded product can deteriorate. For this reason, polycarbonate resin can be blended with various impact modifiers to improve impact resistance.

Although these impact modifiers can improve impact strength of the polycarbonate resin, the use of such impact modifiers can cause other problems. For example, a butadiene rubber-based impact modifier commonly used in polycarbonate tends to degrade or scorch during molding at temperatures greater than 300° C., which can deteriorate heat stability and weather resistance and limit the uses of the resin. An acrylate rubber-based impact modifier may provide good heat stability and weather resistance, but the coloration property and impact resistance at low temperatures can be poor.

U.S. Pat. Nos. 4,994,522 and 5,132,359 are directed to silicone impact modifiers for vinyl chloride resins. However, when these impact modifiers are used in polycarbonate resin, the coloration property still deteriorates.

SUMMARY OF THE INVENTION

The present inventors have developed an impact modifier which can improve the coloration property of polycarbonate resin without degrading other intrinsic properties. The impact modifier of the invention can further provide a polycarbonate with good heat stability, impact resistance at low temperatures and weather resistance.

The impact modifier of the invention can be obtained by preparing a rubber core through cross-polymerization of an alkylacrylate-styrenic aromatic compound in the presence of an organosiloxane cross-linked (co)polymer having a specific particle size and a refractive index and graft (co)polymerizing a vinyl monomer onto the rubber core thereby forming a plastic shell. The refractive index of the impact modifier of the present invention is higher than the refractive index values of about 1.45 to about 1.47 exhibited by conventional silicone impact modifiers.

In one embodiment of the present invention, the silicone impact modifier can include (A) a rubber core including ($a_1$) an organosiloxane cross-linked (co)polymer with an average particle size of about 50 to about 400 nm and ($a_2$) an alkylacrylate-styrenic aromatic compound cross-linked copolymer; and (B) a plastic shell including a vinyl (co)polymer, and the refractive index of the silicone impact modifier can be about 1.49 to about 1.59.

In another embodiment of the present invention, the silicone impact modifier can include (A) a rubber core including ($a_1$) an organosiloxane cross-linked (co)polymer with an average particle size of about 50 to about 400 nm and ($a_2$) an alkylacrylate cross-linked polymer; and (B) a plastic shell including a vinyl (co)polymer, and the refractive index of the silicone impact modifier can be about 1.49 to about 1.59.

DETAILED DESCRIPTION OF THE INVENTION

The present invention now will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

(A) Rubber Core

In one embodiment of the present invention, the rubber core can include ($a_1$) an organosiloxane cross-linked (co)polymer and ($a_2$) an alkylacrylate-styrenic aromatic compound cross-linked copolymer.

The organosiloxane cross-linked (co)polymer can have a refractive index of about 1.41 to about 1.50 and an average particle size of about 50 to about 400 nm. If the refractive index of the organosiloxane cross-linked (co)polymer is less than about 1.41, the refractive index of the impact modifier may not reach the level of about 1.49, and if the refractive index of the organosiloxane cross-linked (co)polymer is more than about 1.50, the glass transition temperature of the organosiloxane polymer can increase. This can increase the affinity of the polymer for organic solvents, which can deteriorate other properties. Therefore, the refractive index of the organosiloxane cross-linked (co)polymer can range from about 1.41 to about 1.50, for example, about 1.41 to about 1.45, to achieve a balance of desirable physical properties.

Preferably, the range of the average particle size of the organosiloxane cross-linked (co)polymer can be about 50 to about 400 nm. When the organosiloxane cross-linked (co)polymer having average particle size falls within the above range, the resulting silicone impact modifier may have good impact modifying effect.

In another embodiment of the present invention, the rubber core can include ($a_1$) an organosiloxane cross-linked (co)polymer with an average particle size of about 50 to about 400 nm and ($a_2$) an alkylacrylate cross-linked polymer. When the rubber core includes the organosiloxane cross-linked (co)polymer and the alkylacrylate cross-linked polymer without any styrenic aromatic compound, the refractive index of the organosiloxane cross-linked (co)polymer can be about 1.44 to about 1.55.

In this embodiment of the invention, if the refractive index of the organosiloxane cross-linked (co)polymer is less than about 1.44, the refractive index of the impact modifier may not reach the level of about 1.49.

The organosiloxane cross-linked (co)polymer ($a_1$) of the present invention can be an organosiloxane (co)polymer which has a cross-linked structure. Examples of the organosiloxane cross-linked (co)polymer can include without limitation polydimethylsiloxane, polymethylphenylsiloxane, polydiphenylsiloxane, and the like, and mixtures thereof. By copolymerizing two or more kinds of organosiloxane monomer/oligomer, the refractive index of the organosiloxane cross-linked copolymer can be adjusted to about 1.41 to about 1.50. Advantageously, the organosiloxane (co)polymer of the present invention is cross-linked. If the organosiloxane (co)polymer is not cross-linked, it can lose rubber properties, which can degrade impact resistance. In addition, the coloration property can also deteriorate due to the diffusion of organosiloxane (co)polymer into the surface of product.

The degree of crosslinking can be determined by the solubility of the organosiloxane cross-linked (co)polymer in an organic solvent. The higher the degree of crosslinking, the lower the solubility in organic solvent. Acetone or toluene can be used as the organic solvent, and it can be useful to have a portion of the organosiloxane cross-linked (co)polymer that is insoluble in toluene or acetone. The content of the insoluble portion of the organosiloxane cross-linked (co)polymer in toluene can be more than about 30%.

Examples of the alkyl acrylate can include without limitation methyl acrylate, ethyl acrylate, n-butyl acrylate, and the like, and mixtures thereof. n-Butyl acrylate can be useful because of its low glass transition temperature.

Examples of the styrenic aromatic compound can include without limitation styrene, α-methylstyrene, divinylbenzene, vinyltoluene, and the like, and mixtures thereof.

The alkylacrylate-styrenic aromatic compound cross-linked copolymer can be prepared by copolymerizing an alkylacrylate with a styrenic aromatic compound in the presence of cross-linking agent.

The weight ratio of ($a_1$) the organosiloxane cross-linked (co)polymer to ($a_2$) the alkylacrylate-styrenic aromatic compound cross-linked copolymer or the alkylacrylate cross-linked copolymer can range from about 1:6 to about 6:1 thereby the impact modifying effect even at low temperature and the affinity between resin and impact modifier can be improved.

The weight ratio of the alkylacrylate to the styrenic aromatic compound in the alkylacrylate-styrenic aromatic compound cross-linked copolymer ($a_2$) can be about 1:1 to about 20:1. If the weight ratio of the alkylacrylate to the styrenic aromatic compound falls within the above range, the resulting silicone impact modifier may have good impact modifying effect. Further, the refractive index and coloration property would not deteriorate.

(B) Plastic Shell

The plastic shell of the present invention can be a vinyl (co)polymer and can be formed on the surface of the rubber core by graft (co)polymerizing a vinyl monomer onto the rubber core.

Examples of the vinyl monomer can include without limitation alkylmethacrylates, acrylates and ethylenically unsaturated aromatic compounds, and the like, and mixtures thereof. Exemplary vinyl monomers can include for example methylmethacylate, styrene, acrylonitrile and mixtures of two or more thereof.

In the present invention, the weight ratio of the rubber core (A) to the plastic shell (B) can be about 5:5 to about 9:1. When the weight ratio of the rubber core (A) to the plastic shell (B) falls within the above range, the resulting silicone impact modifier may have good impact modifying effect.

The impact modifier of the present invention can have a refractive index within the range from about 1.49 to about 1.59, for example, from about 1.50 to about 1.57. If the refractive index is less than about 1.49, the difference in refractive index between the impact modifier and the polycarbonate increases, which can deteriorate coloration.

The method of preparing the silicone impact modifier of the present invention will now be described in detail.

In one embodiment of the present invention, the method of preparing of the silicone impact modifier of the present invention can include preparing a rubber core through cross-polymerization by adding an alkylacrylate and a styrenic aromatic compound to an organosiloxane cross-linked (co)polymer having an average particle size of about 50 to about 400 nm and a refractive index of about 1.41 to about 1.50; and graft (co)polymerizing a vinyl monomer onto the rubber core thereby forming a plastic shell.

In another embodiment of the present invention, the method of preparing of the silicone impact modifier of the present invention can include preparing a rubber core through cross-polymerization by adding an alkylacrylate to an organosiloxane cross-linked (co)polymer having an average particle size of about 50 to about 400 nm and a refractive index of about 1.44 to about 1.55; and graft (co)polymerizing a vinyl monomer onto the rubber core thereby forming a plastic shell.

In the present invention, the organosiloxane cross-linked (co)polymer can be used in a dispersed state (called "silicone latex") prepared by dispersing the organosiloxane cross-linked (co)polymer into ion-exchanged water in the presence of an emulsifier.

The organosiloxane can be selected from the group consisting of dimethylsiloxane, methylphenylsiloxane, diphenylsiloxane, and the like, and a mixture or a copolymer thereof. The organosiloxane cross-linked (co)polymer of the present invention can be used in an amount of about 5 to about 90 parts by weight, for example about 10 to about 50 parts by weight, based on the total weight of reactants.

As the emulsifier, an anionic emulsifier such as a sodium, potassium, or ammonium salt of an alkylsulfate containing from 4 to 30 carbon atoms can be used. Examples of the emulsifier can include without limitation sodium dodecyl sulfate, sodium dodecylbenzene sulfate and the like, and mixtures thereof. Among these, sodium dodecylbenzene sulfate can be useful because of its versatility in a wide range of pH. The emulsifier can be used in an amount of about 0.1 to about 5 parts by weight, for example about 0.1 to about 2 parts by weight, based on the total weight of reactants.

To the silicone latex, an alkyl acrylate monomer, a styrenic aromatic compound and a crosslinking agent can be added under nitrogen stream, and heated to about 50 to about 100° C. The organosiloxane cross-linked (co)polymer is swelled by alkyl acrylate monomer, a styrenic aromatic compound and a crosslinking agent. The polymerization can be carried out at about 50 to about 100° C. by adding a polymerization initiator to obtain the rubber core.

Examples of the alkyl acrylate monomer can include without limitation methyl acrylate, ethyl acrylate, n-butyl acrylate, and the like, and mixtures thereof. n-Butyl acrylate can be useful because of its low glass transition temperature. The alkyl acrylate monomer can be used in an amount of about 5 to about 90 parts by weight, for example about 10 to about 50 parts by weight, based on the total weight of reactants.

Examples of the styrenic aromatic compound can include without limitation styrene, α-methylstyrene, divinylbenzene, vinyltoluene, and the like, and mixtures thereof. The styrenic aromatic compound can be used in an amount of about 0.01 to about 50 parts by weight, for example about 1 to about 30 parts by weight, based on the total weight of reactants.

Examples of the crosslinking agent can include without limitation allyl methacrylate, triallyl cyanurate, triallyl isocyanurate, divinylbenzene, and the like, and mixtures thereof. The crosslinking agent can be used in an amount of about 0.1 to about 10 parts by weight, for example about 0.1 to about 5 parts by weight, based on the total weight of reactants.

As the polymerization initiator, free-radical initiators that generate free-radicals through thermal decomposition or oxidation-reduction reaction can be used. Suitable polymerization initiators can include without limitation potassium persulfate, magnesium persulfate, benzoyl peroxide, hydrogen peroxide, dibenzyl peroxide, cumene hydroperoxide, tert-butyl hydroperoxide, and the like, and mixtures thereof. Among these, water-soluble initiators such as potassium persulfate can be useful. The polymerization initiator can be used in an amount of about 0.1 to about 5 parts by weight, for example, about 0.1 to about 2 parts by weight.

To the rubber core, a polymerization initiator and a vinyl monomer can be added dropwise continuously at about 50 to about 100° C. to form a plastic shell, followed by coagulation by means of the addition of a coagulating agent and filtration to prepare a silicone impact modifier with high refractive index.

Examples of the vinyl monomer can include without limitation alkylmethacrylates, acrylates, ethylenically unsaturated aromatic compounds, and the like, and mixtures thereof. Methylmethacylate, styrene, acrylonitrile or a mixture of two or more thereof can be useful. The vinyl monomer of the present invention can be used in an amount of about 5 to about 90 parts by weight, for example about 10 to about 50 parts by weight, based on the total weight of reactants.

As the coagulating agent, a metal salt such as magnesium chloride, calcium chloride, magnesium sulfate, calcium sulfate, and the like, and mixtures thereof can be used.

The impact modifier thus obtained can have a high refractive index of about 1.49 to about 1.59. The impact modifier of the present invention can provide a thermoplastic resin with good heat stability, impact resistance even at low temperatures, weather resistance, and excellent coloration. The thermoplastic resin that can be used in the present invention is not particularly limited. Examples of the thermoplastic resin can include without limitation a vinyl chloride resin, a styrenic resin, a styrene-acrylonitrile resin, an acrylic resin, a polyester resin, an ABS resin, a polycarbonate resin, and the like, as mixtures thereof. When the impact modifier of the present invention is used in polycarbonate resin for housings of electronic instrument, the effect can be especially magnified.

When the thermoplastic resin is a polycarbonate resin, the silicone impact modifier of the present invention can be blended into the composition in an amount of about 0.5 to about 30 parts by weight, per 100 parts by weight of the polycarbonate resin.

The present invention may be better understood by reference to the following examples that are intended for the purpose of illustration and are not to be construed as in any way limiting the scope of the present invention, which is defined in the claims appended hereto.

EXAMPLES

Example 1

90 g of dimethylsiloxane-diphenylsiloxane cross-linked copolymer having a refractive index of 1.43, an average particle size of 170 nm and 65% of an insoluble portion in toluene and 1.4 g of sodium dodecylbenzene sulfate are dispersed into 760 g ion-exchanged water to obtain a silicone latex. To the silicone latex, 190 g of n-butylacrylate, 36 g of styrene and 9 g of triallyl isocyanurate are added and mixed at room temperature. To the mixture is added 1.8 g of potassium persulfate maintaining the temperature at 75° C. and the polymerization is carried out for 4 hours. Further added to the mixture is 0.7 g potassium persulfate followed by the dropwise addition of a mixed solution consisting of 101.25 g of styrene and 33.75 g of acrylonitrile for 15 minutes. After reacting for 4 hours at 75° C., the system is cooled to room temperature. The conversion is 97.4%. The obtained latex is coagulated in a 1.5% aqueous $MgSO_4$ solution maintained at 75° C., and then the coagulated latex is washed and dried to obtain an impact modifier in a powder form.

Example 2

112.5 g of dimethylsiloxane-diphenylsiloxane cross-linked copolymer having a refractive index of 1.45, an average particle size of 210 nm and 60% of an insoluble portion in toluene and 2.7 g of sodium dodecylbenzene sulfate are dispersed into 980 g of ion-exchanged water to obtain a silicone latex. To the silicone latex, 112.5 g of n-butylacrylate, 90 g of styrene and 9 g of triallyl isocyanurate are added and mixed at room temperature. The subsequent procedure is conducted in the same manner as in Example 1 to obtain an impact modifier in a powder form. The conversion is 95.8%.

Example 3

112.5 g of dimethylsiloxane-diphenylsiloxane cross-linked copolymer having a refractive index of 1.49, an average particle size of 130 nm and 55% of an insoluble portion in toluene and 2.7 g of sodium dodecylbenzene sulfate are dispersed into 980 g of ion-exchanged water to obtain a silicone latex. To the silicone latex, 107.8 g of n-butylacrylate, 90 g of styrene and 4.7 g of allyl methacrylate are added and mixed at room temperature. The subsequent procedure is conducted in the same manner as in Example 1 to obtain an impact modifier in a powder form. The conversion is 95.2%.

Example 4

157.5 g of dimethylsiloxane-diphenylsiloxane cross-linked copolymer having a refractive index of 1.45, a average particle size of 210 nm and 60% of an insoluble portion in toluene and 0.9 g of sodium dodecylbenzene sulfate are dispersed into 660 g of ion-exchanged water to obtain a silicone latex. To the silicone latex, 158 g of n-butylacrylate and 4.7 g of triallyl isocyanurate are added and mixed at room temperature. The subsequent procedure is conducted in the same manner as in Example 1 to obtain an impact modifier in a powder form. The conversion is 93.0%.

Example 5

67.5 g of dimethylsiloxane cross-linked polymer having a refractive index of 1.41, an average particle size of 250 nm and 68% of an insoluble portion in toluene and 3.2 g of sodium dodecylbenzene sulfate are dispersed into 980 g ion-exchanged water to obtain a silicone latex. To the silicone latex, 171 g of n-butylacrylate, 76.5 g of styrene and 4.5 g of allyl methacrylate are added and mixed at room temperature. To the mixture is added 1.8 g of potassium persulfate maintaining the temperature at 75° C. and the polymerization is carried out for 4 hours. Further added to the mixture is 0.68 g potassium persulfate followed by the dropwise addition of a mixed solution consisting of 49.5 g of styrene, 36 g of acrylonitrile and 49.5 g of methylmethacrylate for 15 minutes. The subsequent procedure is conducted in the same manner as in Example 1 to obtain an impact modifier in a powder form. The conversion is 95.2%.

Comparative Example 1

157.5 g of dimethylsiloxane cross-linked polymer having a refractive index of 1.41, an average particle size of 300 nm and 69% of an insoluble portion in toluene and 3.15 g of sodium dodecylbenzene sulfate are dispersed into 976 g of ion-exchanged water to obtain a silicone latex. To the silicone latex, 153 g of n-butylacrylate and 4.5 g of allyl methacrylate are added and mixed at room temperature. The subsequent procedure is conducted in the same manner as in Example 1 to obtain an impact modifier in a powder form. The conversion is 97.6%.

Comparative Example 2

Metablen SRK-200 (product name) manufactured by Mitsubishi Rayon Company of Japan is used as a silicone impact modifier.

Comparative Example 3

Comparative Example 3 is conducted in the same manner as in Example 1 except that 90 g of dimethylsiloxane-diphenylsiloxane linear copolymer having a refractive index of 1.43, an average particle size of 220 nm and less than 5% of an insoluble portion in toluene is used instead of dimethylsiloxane-diphenylsiloxane cross-linked copolymer. The conversion is 94.6%.

The physical properties of the silicone impact modifiers obtained in the above Examples and Comparative Examples are measured as follows:

(1) Refractive Index: Using samples prepared by hot pressing the resulting impact modifier to a thickness of 1 mm, the refractive index is measured by using a light of laser wave length 632.8 nm by a prism coupler type laser refractometer (product name: SPA-4000) made by Sairon Tech. Company.

(2) Coloration Property: The coloration property is evaluated using molded samples prepared by mixing polycarbonate, impact modifier and carbon black in proportion of 97:3:0.2 by observing it with the naked eyes. Also, brightness (L*) of the molded sample is measured by means of a spectrophotometer (CM-3600d) manufactured by Konica Minota Company.

(3) Impact Resistance: Polycarbonate, impact modifier and carbon black are mixed in proportion of 97:3:0.2 and extruded through a twin screw extruder with Φ=45 mm in pellets. The pellets are dried at 110° C. over 3 hours and then molded using a 10 oz injection molding machine at 260~330° C. and barrel temperature of 60~100° C. into ⅛" Izod test bars and plate test specimens (thickness: 3 mm) respectively. The impact resistance is evaluated by the Izod impact resistance test in accordance with ASTM D-256 and by the falling ball impact test.

TABLE 1

| | | Refractive Index | L*,[a] | Coloration Eye test | Izod Impact strength (kgf·cm/cm) 25° C. | −30° C. | Falling Ball Impact Test Breakdown (%) |
|---|---|---|---|---|---|---|---|
| Examples | 1 | 1.502 | 8 | good | 81 | 24 | 0 |
| | 2 | 1.519 | 7 | good | 80 | 23 | 0 |
| | 3 | 1.530 | 6 | Very good | 75 | 21 | 0 |
| | 4 | 1.492 | 10 | good | 80 | 23 | 0 |
| | 5 | 1.497 | 10 | good | 83 | 22 | 0 |
| Comparative Examples | 1 | 1.472 | 19 | bad | 76 | 24 | 0 |
| | 2 | 1.475 | 20 | Very bad | 80 | 25 | 0 |
| | 3 | 1.500 | 12 | bad | 73 | 19 | 5 |

[a] The lower the brightness (L*), the better the coloration property.

As shown above, the impact modifiers of Examples 1-5 show higher refractive index (more than 1.49) and better coloration property without deterioration of impact strength as compared to Comparative Examples 1-2. In particular, the impact modifier of Comparative Example 3 which employs linear organosiloxane copolymer shows poor impact strength and bad coloration property and even has a high refractive index of 1.500.

Many modifications and other embodiments of the invention will come to mind to one skilled in the art to which this invention pertains having the benefit of the teachings presented in the foregoing descriptions. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

What is claimed is:

1. A silicone impact modifier comprising:
   (A) a rubber core comprising ($a_1$) an organosiloxane cross-linked (co)polymer having an average particle size of about 50 to about 400 nm and ($a_2$) an alkylacrylate-styrenic aromatic compound cross-linked copolymer; and
   (B) a plastic shell comprising a vinyl (co)polymer;
   wherein the refractive index of the silicone impact modifier is about 1.49 to about 1.59.

2. The silicone impact modifier as defined in claim 1, wherein the refractive index of said organosiloxane cross-linked (co)polymer ($a_1$) is about 1.41 to about 1.50.

3. The silicone impact modifier as defined in claim 1, wherein the weight ratio of ($a_1$) the organosiloxane cross-linked (co)polymer to ($a_2$) the alkylacrylate-styrenic aromatic compound cross-linked copolymer is about 1:6 to about 6:1.

4. The silicone impact modifier as defined in claim 1, wherein the weight ratio of the alkylacrylate to the styrenic aromatic compound in said alkylacrylate-styrenic aromatic compound cross-linked copolymer (a₂) is about 1:1 to about 20:1.

5. The silicone impact modifier as defined in claim 1, wherein the weight ratio of the rubber core (A) to the plastic shell (B) is about 5:5 to about 9:1.

6. A silicone impact modifier comprising:
(A) a rubber core comprising (a₁) an organosiloxane cross-linked (co)polymer with an average particle size of about 50 to about 400 nm and (a₂) an alkylacrylate cross-linked polymer; and
(B) a plastic shell comprising a vinyl (co)polymer;
wherein the refractive index of the silicone impact modifier is about 1.49 to about 1.59.

7. The silicone impact modifier as defined in claim 6, wherein the refractive index of said organosiloxane cross-linked (co)polymer (a₁) is about 1.44 to about 1.55.

8. The silicone impact modifier as defined in claim 6, wherein the weight ratio of (a₁) the organosiloxane cross-linked (co)polymer to (a₂) the alkylacrylate cross-linked copolymer is about 1:6 to about 6:1.

9. The silicone impact modifier as defined in claim 6, wherein the weight ratio of the rubber core (A) to the plastic shell (B) is about 5:5 to about 9:1.

10. A thermoplastic resin composition comprising:
a thermoplastic resin; and
a silicone impact modifier comprising: (A) a rubber core comprising (a₁) an organosiloxane cross-linked (co)polymer having an average particle size of about 50 to about 400 nm and (a₂) an alkylacrylate-styrenic aromatic compound cross-linked copolymer; and (B) a plastic shell comprising a vinyl (co)polymer; wherein the refractive index of the silicone impact modifier is about 1.49 to about 1.59.

11. The thermoplastic resin composition as defined in claim 10, wherein the refractive index of said organosiloxane cross-linked (co)polymer (a₁) is about 1.41 to about 1.50.

12. The thermoplastic resin composition as defined in claim 10, wherein the weight ratio of (a₁) the organosiloxane cross-linked (co)polymer to (a₂) the alkylacrylate-styrenic aromatic compound cross-linked copolymer is about 1:6 to about 6:1.

13. The thermoplastic resin composition as defined in claim 10, wherein the weight ratio of the alkylacrylate to the styrenic aromatic compound in said alkylacrylate-styrenic aromatic compound cross-linked copolymer (a₂) is about 1:1 to about 20:1.

14. The thermoplastic resin composition as defined in claim 10, wherein the weight ratio of the rubber core (A) to the plastic shell (B) is about 5:5 to about 9:1.

15. The thermoplastic resin composition as defined in claim 10, wherein said thermoplastic resin is selected from the group consisting of a vinyl chloride resin, a styrenic resin, a styrene-acrylonitrile resin, an acrylic resin, a polyester resin, an ABS resin and a polycarbonate resin.

16. The thermoplastic resin composition as defined in claim 10, wherein said thermoplastic resin is a polycarbonate resin, and the impact strength modifier is blended into the composition in an amount of about 0.5 to about 30 parts by weight, per 100 parts by weight of the polycarbonate resin.

17. A thermoplastic resin composition comprising:
a thermoplastic resin; and
a silicone impact modifier comprising (A) a rubber core comprising (a₁) an organosiloxane cross-linked (co)polymer with an average particle size of about 50 to about 400 nm and (a₂) an alkylacrylate cross-linked polymer; and (B) a plastic shell comprising a vinyl (co)polymer, wherein the refractive index of the silicone impact modifier is about 1.49 to about 1.59.

18. The thermoplastic resin composition as defined in claim 17, wherein the refractive index of said organosiloxane cross-linked (co)polymer (a₁) is about 1.44 to about 1.55.

19. The thermoplastic resin composition as defined in claim 17, wherein the weight ratio of (a₁) the organosiloxane cross-linked (co)polymer to (a₂) the alkylacrylate cross-linked copolymer is about 1:6 to about 6:1.

20. The thermoplastic resin composition as defined in claim 17, wherein the weight ratio of the rubber core (A) to the plastic shell (B) is about 5:5 to about 9:1.

21. The thermoplastic resin composition as defined in claim 17, wherein said thermoplastic resin is selected from the group consisting of a vinyl chloride resin, a styrenic resin, a styrene-acrylonitrile resin, an acrylic resin, a polyester resin, an ABS resin and a polycarbonate resin.

22. The thermoplastic resin composition as defined in claim 17, wherein said thermoplastic resin is a polycarbonate resin, and the impact strength modifier is blended into the composition in an amount of about 0.5 to about 30 parts by weight, per 100 parts by weight of the polycarbonate resin.

23. The silicone impact modifier as defined in claim 1, wherein said organosiloxane cross-linked (co)polymer comprises dimethylsiloxane, methylphenylsiloxane, diphenylsiloxane, a copolymer thereof, or a mixture thereof.

24. The silicone impact modifier as defined in claim 23, wherein said organosiloxane cross-linked (co)polymer comprises methylphenylsiloxane, diphenylsiloxane, a copolymer thereof, or a mixture thereof.

25. The silicone impact modifier as defined in claim 24, wherein said organosiloxane cross-linked (co)polymer comprises dimethylsiloxane-diphenylsiloxane crosslinked copolymer.

26. The silicone impact modifier as defined in claim 1, wherein alkylacrylate comprises methyl acrylate, ethyl acrylate, n-butylacrylate, or a mixture thereof.

27. The silicone impact modifier as defined in claim 26, wherein alkylacrylate comprises n-butylacrylate.

28. The silicone impact modifier as defined in claim 1, wherein the rubber core (A) comprises a cross-polymerized organosiloxane cross-linked (co)polymer, alkylacrylate and styrenic aromatic compound.

29. The silicone impact modifier as defined in claim 6, wherein said organosiloxane cross-linked (co)polymer comprises dimethylsiloxane, methylphenylsiloxane, diphenylsiloxane, a copolymer thereof, or a mixture thereof.

30. The silicone impact modifier as defined in claim 29, wherein said organosiloxane cross-linked (co)polymer comprises methylphenylsiloxane, diphenylsiloxane, a copolymer thereof, or a mixture thereof.

31. The silicone impact modifier as defined in claim 30, wherein said organosiloxane cross-linked (co)polymer comprises dimethylsiloxane-diphenylsiloxane crosslinked copolymer.

32. The silicone impact modifier as defined in claim 6, wherein alkylacrylate comprises methyl acrylate, ethyl acrylate, n-butylacrylate, or a mixture thereof.

33. The silicone impact modifier as defined in claim 32, wherein alkylacrylate comprises n-butylacrylate.

34. The silicone impact modifier as defined in claim 6, wherein said rubber core (A) comprises a cross-polymerized organosiloxane cross-linked (co)polymer and alkylacrylate.

* * * * *